United States Patent [19]

Okano et al.

[11] 4,279,576

[45] Jul. 21, 1981

[54] ROTATING SPEED DETECTING DEVICE OF A TURBOCHARGER

[75] Inventors: Hiroshi Okano; Yoshihisa Gunji, both of Susono, Japan

[73] Assignee: Toyota Jidosha Kogyo Kabushiki Kaisha, Aichi, Japan

[21] Appl. No.: 52,858

[22] Filed: Jun. 28, 1979

[30] Foreign Application Priority Data

Apr. 9, 1979 [JP] Japan .................................. 54-42001

[51] Int. Cl.³ ...................... F02B 37/00; G01P 3/481
[52] U.S. Cl. .................................. 417/407; 324/173;
324/179; 403/30; 416/241 B; 416/244 A
[58] Field of Search ........................ 324/173, 179, 208;
73/518, 661; 417/407; 403/28, 30, 361, 404;
415/30, 40, 44, 45; 416/241 B, 244 A

[56] References Cited

U.S. PATENT DOCUMENTS

| 3,019,039 | 1/1962 | Clavell | 403/30 |
| 3,313,129 | 4/1967 | Stock | 324/173 |
| 3,321,565 | 5/1967 | Peterson | 403/30 |
| 4,013,954 | 3/1977 | Deem | 324/173 |
| 4,101,243 | 7/1978 | Tatkov | 417/407 |
| 4,166,977 | 9/1979 | Glauert | 324/173 |
| 4,167,351 | 9/1979 | Bindin | 403/30 |
| 4,207,035 | 6/1980 | Perr | 417/407 |

Primary Examiner—Michael Koczo, Jr.
Attorney, Agent, or Firm—Stevens, Davis, Miller & Mosher

[57] ABSTRACT

A rotating speed detecting device of a turbocharger comprising the compressor wheel and the turbine wheel which are fixed onto the opposed ends of the rotary shaft. A hole is formed on the central portion of the shaft. An electromagnetic detector is arranged in the vicinity of the central portion of the shaft so that the detecting head of the detector can face the hole of the shaft.

6 Claims, 3 Drawing Figures

ROTATING SPEED DETECTING DEVICE OF A TURBOCHARGER

DESCRIPTION OF THE INVENTION

The present invention relates to a rotating speed detecting device of a turbocharger.

As is well known to those skilled in the art, a turbocharger is used, for example, for increasing the output power of an internal combustion engine. In such a turbocharger, the rotating speed of the turbocharger is normally detected in such a way that the detecting portion of the electromagnetic detector is arranged in the vicinity of the locknut used for fixing the compressor wheel onto the rotary shaft of the turbocharger so that the change in the magnetic reluctance of the magnetic circuit formed by the locknut, the core of the detecting head of the detector and the air gap formed therebetween is detected by the detector. However, in this case, since it is necessary to position the detector within the air inlet of the compressor, the detector prevents the suction air from flowing smoothly into the compressor and, at the same time, the presence of the detector causes a turbulence in the suction air. This results in a problem in that the efficiency of the turbocharger is reduced. In addition, in the case wherein the locknut is loosened and, as a result, the detector comes into contact with the locknut and is destroyed, there is a danger that destroyed pieces of the detector will strike upon the blades of the compressor wheel which are rotating at a high speed and cause the destruction of the blades of the compressor wheel.

An object of the present invention is to provide a rotating speed detecting device capable of ensuring the smooth flow of the suction air and also capable of avoiding the danger of destroying the blades of the compressor wheel in the case wherein the detector is destroyed.

According to the present invention, there is provided a turbocharger, comprising: a housing; a shaft rotatably mounted on said housing and extending through said housing, said shaft having at its opposed ends a compressor wheel and a turbine wheel and having a circumferential outer wall which is located between said compressor wheel and said turbine wheel and forms at least one recessed portion thereon, and; detecting means mounted on said housing and having a detecting portion which is arranged to face said recessed portion in the vicinity of the circumferential outer wall of said shaft.

The present invention may be more fully understood from the description of a preferred embodiment of the invention set forth below, together with the accompanying drawings.

DESCRIPTION OF A PREFERRED EMBODIMENT

Figure 1:
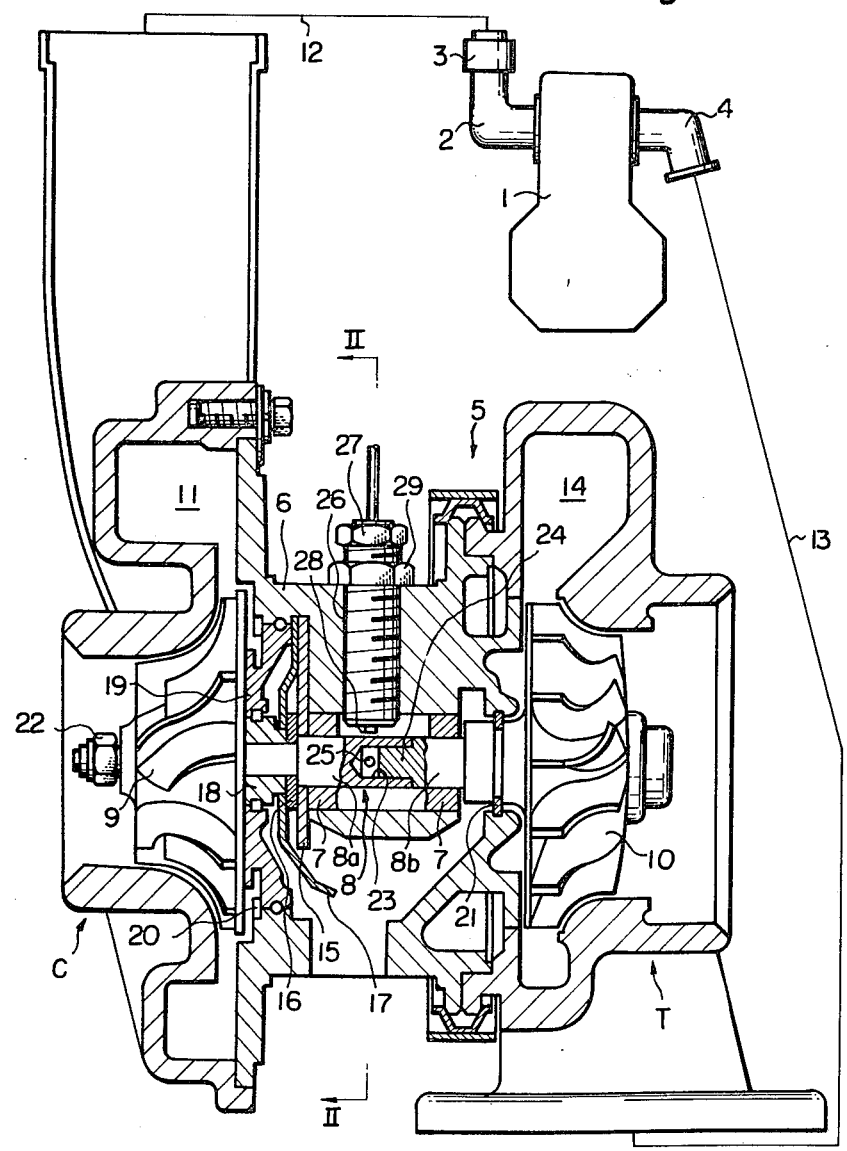
FIG. 1 is a cross-sectional side view of a turbocharger according to the present invention.

Referring to FIG. 1, 1 designates an engine body, 2 an intake manifold, 3 a carburetor, 4 an exhaust manifold and 5 a turbocharger. The turbocharger 5 has in its housing 6 a rotary shaft 8 rotatably supported by a pair of bearings 7, and a centrifugal compressor wheel 9 and a turbine wheel 10 which are fixed onto the opposed ends of the rotary shaft 8. A compressed air delivery chamber 11 of the compressor C is connected to the intake manifold 2 via an air duct 12 and the carburetor 3, and the exhaust manifold 4 is connected to an exhaust gas inflow chamber 14 of the turbine T via an exhaust duct 13. The turbocharger 5 further comprises a thrust bearing 15, a thrust ring 16, an oil deflector 17, a sleeve 18, an insert 19, a snap ring 20 and a sealing ring 21 in the housing 6. When the engine is operating, the air compressed by the rotating motion of the compressor wheel 9 is fed into the cylinders of the engine via the air duct 12, and the exhaust gas discharged from the cylinders of the engine is discharged into the atmosphere after the exhaust gas provides the rotating force to turn the turbine wheel 10.

As illustrated in FIG. 1, the rotary shaft 8 comprises a pair of shaft portions 8a and 8b, and the shaft portion 8a is made of metallic material. The compressor wheel 9 is fixed onto one end of the shaft portion 8a by means of a nut 22, and a cylindrical hole 23 is formed on the other end of the shaft portion 8a. On the other hand, the shaft portion 8b is formed in one piece on the rear face of the turbine wheel 10 and has on its inner end a reduced diameter portion 24. In addition, the shaft portion 8b and the turbine wheel 10 are made of ceramic material. As illustrated in FIG. 1, the reduced diameter portion 24 of the shaft portion 8b is shrinkage-fitted into the cylindrical hole 23 of the shaft portion 8a so that the shaft portions 8a and 8b are rigidly interconnected to each other. In addition, an air vent 25 which is in communication with the deep interior of the cylindrical hole 23 is formed on the outer circumferential wall of the shaft portion 8a. When the shaft portions 8a and 8b are assembled into the housing 6 of the turbocharger 5, by forming the air vent 25 as mentioned above, the reduced diameter portion 24 of the shaft portion 8b can be easily shrinkage-fitted into the cylindrical hole 23 of the shaft portion 8a. An electromagnetic detector 27 is screwed into a threaded hole 26 formed on the housing 6, and the detector 27 is secured onto the housing 6 by means of a nut 29 so that a detecting portion 28 formed at the tip of the detector 27 is positioned in the vicinity of the outer circumferential wall of the shaft portion 8a and can face the air vent 25.

Figure 2:
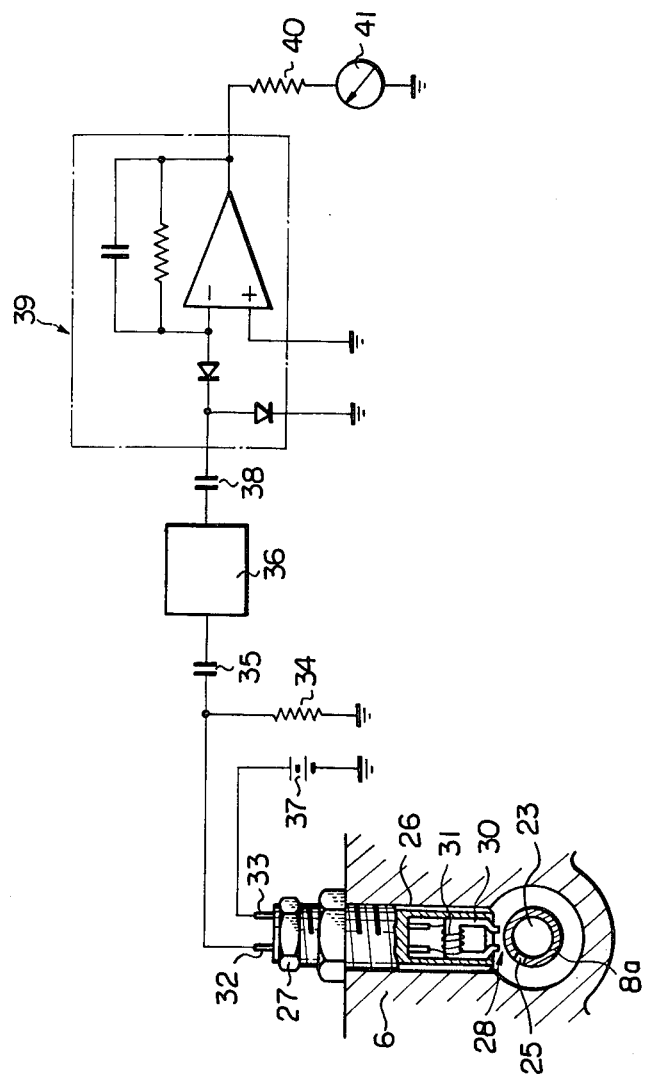
FIG. 2 is a cross-sectional side view of a part of the turbocharger, taken along line II—II in FIG. 1.
Figure 3:
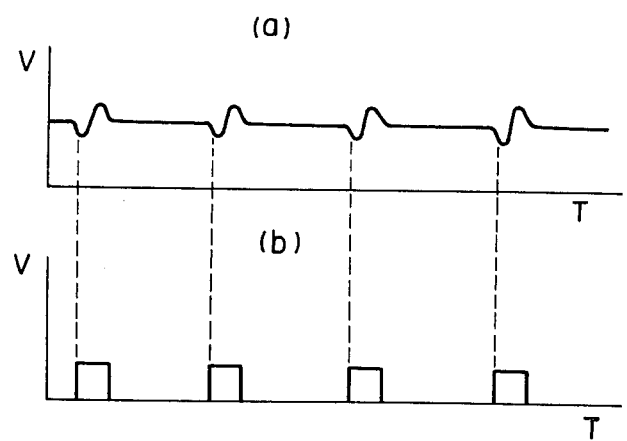
FIG. 3 is a graph showing changes in voltage.

As illustrated in FIG. 2, inside the detector 27 there is a detecting head comprising a core 30 and a coil 31, and the opposed ends of the coil 31 are connected to corresponding external terminals 32 and 33. The external terminal 32 is connected to the ground via a resistor 34 on one hand and to the input of a wave form shaper 36 via a coupling condenser 35 on the other hand. In this embodiment, the wave form shaper 36 comprises a monostable multivibrator. In addition, the external terminal 33 is connected to a power source 37. The output of the wave form shaper 36 is connected to the input of a frequency-voltage converter 39 via a coupling condenser 38, and the output of the frequency-voltage converter 39 is connected to a tachometer 41 via a resistor 40. When the shaft portion 8a is rotating, the magnetic reluctance of the magnetic circuit formed by the core 30, the shaft portion 8a and the air gap formed therebetween is changed everytime the air vent 25 faces the detecting portion 28 of the detector 27. As a result of this, the voltage as shown in FIG. 3(a) is produced on the external terminal 32. In FIGS. 3(a) and (b), the ordinate V indicates voltage, and the abscissa T indicates time. The wave form shaper 36 is triggered by the falling portion of the voltage produced on the external terminal 32 and produces a pulse having a constant width as illustrated in FIG. 3(b). The frequency-voltage converter 39 produces a voltage having a level which is proportional to the frequency of the pulse and, thus, the number of revolutions per minite of the rotary shaft 8 can be detected by the tachometer 41.

It is preferable that the diameter of the air vent 25 formed on the shaft portion 8a be equal to or slightly larger than the distance between the projecting tips of the core 30. In addition, in the embodiment illustrated in FIG. 1, the single air vent 25 is formed on the shaft portion 8a. However, instead of forming the single air vent 25, a plurality of air vents equally spaced along the circumferential outer wall of the shaft portion 8a may be formed on the shaft portion 8a. Furthermore, instead of using a detector having the construction of the detector 27 illustrated in FIG. 2, a detector having any other construction may be used.

According to the present invention, since the detector is not arranged in the flow passage of the suction air, the detector does not prevent the suction air from flowing smoothly into the compressor and, thus, there is no danger that the efficiency of the turbocharger is reduced. In addition, in the case wherein the rotating speed of the turbocharger is detected by using the locknut of the compressor wheel as in a conventional rotating speed detecting derive, it is necessary to support the detector by means of a support member. However, in the present invention, such a support member is not necessary. Furthermore, in a conventional speed detecting device, since the irregurality in the shape of the locknut of the compressor wheel disturbs the wave form of the detecting signal of the detector, there is a danger that the number of revolutions per minute of the tarbocharger will not be detected correctly. However, in the present invention, even if the diameter and the position of the air vent are different from the predetermined diameter and position, the output voltage of the detector, which sharply varies, can be obtained and, thus, the correct number of revolutions per minute of the turbocharger can be always obtained. In addition, in the present invention, even if the locknut of the detector is loosened and, as a result, the detector comes into contact with the ratary shaft and is destroyed, there is no danger that destroyed pieces of the detector will strike the blades of the compressor wheel and the turbine wheel.

While the invention has been described by reference to a specific embodiment chosen for purposes of illustration, it should be apparent that numerous modifications could be made thereto by those skilled in the art without departing from the spirit and scope of the invention.

What is claimed is:

1. A turbocharger comprising:
  a housing;
  a shaft rotatably mounted on said housing and extending through said housing, said shaft having at its opposed ends a compressor wheel and a turbine wheel and having a circumferential outer wall which is located between said compressor wheel and said turbine wheel and forms at least one recessed portion thereon, said shaft comprises a first shaft portion connected to said compressor wheel and having a cylindrical hole at an inner end thereof, and a second shaft portion connected to said turbine wheel and having a reduced diameter portion fitted into said cylindrical hole, said recessed portion forming an air vent which is in communication with said cylindrical hole; and
  detecting means mounted on said housing and having a detecting portion which is arranged to face said recessed portion in the vicinity of the circumferential outer wall of said shaft.

2. A turbocharger as claimed in claim 1, wherein the circumferential outer wall of said shaft is made of metallic material, and said circumferential outer wall, said detecting portion and an air gap formed therebetween form a magnetic circuit.

3. A turbocharger as claimed in claim 2, wherein said detecting portion has therein a core forming a part of said magnetic circuit.

4. A turbocharger as claimed in claim 3, wherein said core has a pair of projecting tips arranged in the vicinity of the circumferential outer wall of said shaft, said recessed portion having a diameter which is approximately equal to the distance between said projecting tips.

5. A turbocharger as claimed in claim 3, wherein said core has a pair of projecting tips spaced from each other and arranged in the vicinity of the circumferential outer wall of said shaft, said recessed portion having a diameter which is larger than the distance between said projecting tips.

6. A turbocharger as claimed in claim 1, wherein said first shaft portion is made of metallic material, said second shaft portion being made of ceramic material and formed in one piece on said turbine wheel, the reduced diameter portion of said second shaft portion being shrinkage-fitted into the cylindrical hole of said first shaft portion.

* * * * *